T. E. MURRAY.
INSULATING PIPE COUPLING.
APPLICATION FILED MAR. 25, 1915.

1,165,114.

Patented Dec. 21, 1915.

Inventor
Thomas E. Murray
By his Attorney
Park Benjamin

UNITED STATES PATENT OFFICE.

THOMAS E. MURRAY, OF NEW YORK, N. Y.

INSULATING PIPE-COUPLING.

1,165,114.  Specification of Letters Patent.  Patented Dec. 21, 1915.

Application filed March 25, 1915. Serial No. 16,988.

*To all whom it may concern:*

Be it known that I, THOMAS E. MURRAY, a citizen of the United States, residing at New York, in the county of New York and State of New York, have invented a certain new and useful Improvement in Insulating Pipe-Couplings, of which the following is a specification.

The invention is an insulating pipe coupling, and has for its object to connect service pipes—such as used for gas or water, or containing electrical conductors—with the piping within a building, and at the same time to act as a shield to prevent stray electrical currents on said service pipes from passing to the building pipes, and so being led to places where they may do harm.

The invention consists in the construction hereinafter set forth, whereby the coupling is inclosed within the two pipes to be connected in such a way that no enlargements of said pipes are required, and so that no part of the coupling itself need appear except the insulating collar which lies between the extremities of the pipes.

Figure 1:
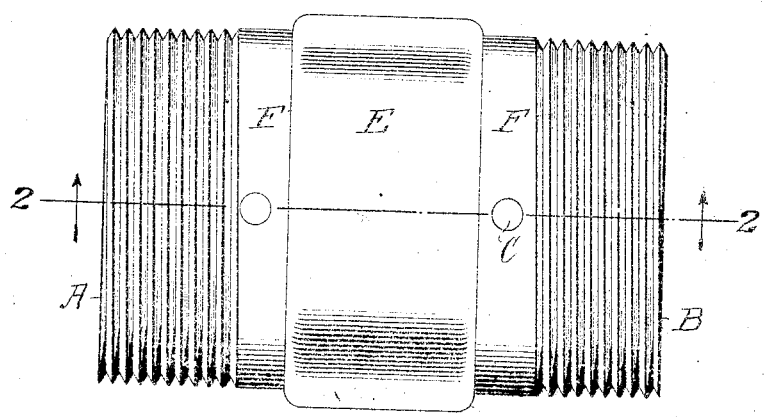
Figure 2:
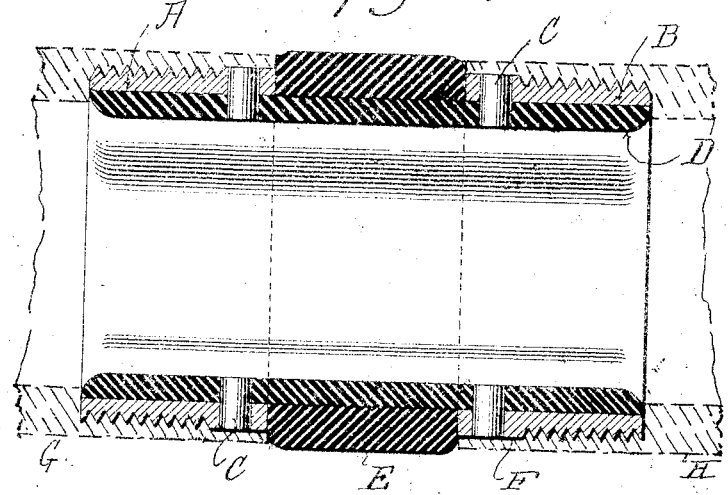

In the accompanying drawings—Figure 1 is an elevation of my insulating pipe coupling. Fig. 2 is a longitudinal section on the line 2, 2 of Fig. 1.

Similar letters of reference indicate like parts.

A and B are two exteriorly threaded metal rings, secured by pins C—or by any other suitable means—upon a short tube D of fiber or other insulating material. The inner edges of the rings A, B are preferably seated against a collar E, also of insulating material, which may be fastened upon the tube D at its middle portion, or which, if desired, may be made integral with said tube. At the inner ends of the metal rings may be left unthreaded portions F.

The pipes G, H—dotted lines Fig. 2—to be united are interiorly threaded to engage the threads on rings A, B, and when in place preferably meet the collar E, as shown in Fig. 2. By this construction the two connected pipes G, H are insulated one from the other, so that if, for example, the pipe G connects with piping within a building and pipe H with service pipes outside, stray electric currents which may pass upon pipe H cannot enter the building and do possible injury therein.

I claim:

1. An insulating pipe coupling, comprising a tube of insulating material, and two separated metallic rings secured on said tube and having their outer ends registering with the ends of said tube, the said rings being externally threaded.

2. An insulating pipe coupling, comprising a tube of insulating material, a collar of like material on said tube, and two externally threaded metallic rings of less thickness than said collar secured on said tube on opposite sides of said collar and abutting at their inner ends against said collar and having their outer ends registering with the ends of said tube.

3. An insulating pipe coupling, comprising a tube of insulating material, a collar of like material on said tube, and two metallic rings threaded for a portion of their width from their outer ends, secured on said tube on opposite sides of said collar and abutting at their inner ends against said collar and having their outer ends registering with the ends of said tube.

4. In combination with pipe ends to be coupled, each pipe having an internally threaded enlargement at its extremity, a tube of insulating material seated at its ends in said enlargement, and two separated metallic rings secured on said tube, registering at their extremities with the ends of said tube, and externally threaded to engage with said pipe threads.

In testimony whereof I have affixed my signature in presence of two witnesses.

THOMAS E. MURRAY.

Witnesses:
 GERTRUDE P. PORTER,
 MAY T. McGARRY.